US008638980B2

(12) United States Patent
Gutierrez M et al.

(10) Patent No.: US 8,638,980 B2
(45) Date of Patent: Jan. 28, 2014

(54) USE OF POWDERS FOR CREATING IMAGES ON OBJECTS, WEBS OR SHEETS

(75) Inventors: Lydia E. Gutierrez M, Nazareth, PA (US); Peter J. Mason, Webster, NY (US); Thomas Hilbert, Spencerport, NY (US); Charles DeBoer, Ithaca, NY (US); Richard D Ornelaz, Jr., Frisco, TX (US)

(73) Assignees: Mars Incorporated, McLean, VA (US); Torrey Pines Research, Fairport, NY (US)

( * ) Notice: Subject to any disclaimer, the term of this patent is extended or adjusted under 35 U.S.C. 154(b) by 0 days.

(21) Appl. No.: 13/336,595

(22) Filed: Dec. 23, 2011

(65) Prior Publication Data

US 2012/0092434 A1 Apr. 19, 2012

Related U.S. Application Data

(62) Division of application No. 12/300,232, filed as application No. PCT/US2007/068676 on May 10, 2007, now Pat. No. 8,107,673.

(60) Provisional application No. 60/800,069, filed on May 12, 2006.

(51) Int. Cl.
*G06K 9/00* (2006.01)

(52) U.S. Cl.
USPC ................. 382/100; 360/31; 360/35; 369/14; 369/313

(58) Field of Classification Search
USPC ........... 382/100; 360/31, 35, 59, 313; 369/14, 369/313; 374/5, 7; 118/56, 620; 347/220, 347/469; 503/204, 209
See application file for complete search history.

(56) References Cited

U.S. PATENT DOCUMENTS

| | | | | |
|---|---|---|---|---|
| 3,256,811 A | | 6/1966 | Bach | 101/467 |
| 4,063,808 A | | 12/1977 | Simpson | 347/129 |
| 4,461,563 A | | 7/1984 | Favata | 399/101 |
| 5,138,388 A | | 8/1992 | Kamp et al. | 347/129 |
| 5,227,265 A | | 7/1993 | DeBoer et al. | 430/41 |
| 5,600,405 A | | 2/1997 | Umeda et al. | 399/71 |
| 5,729,815 A | | 3/1998 | Lindblad et al. | 399/354 |
| 5,800,601 A | | 9/1998 | Zou et al. | 106/31.65 |
| 5,850,374 A | * | 12/1998 | Abraham et al. | 369/14 |
| 5,933,697 A | | 8/1999 | Onodera et al. | 399/406 |

(Continued)

FOREIGN PATENT DOCUMENTS

| | | | |
|---|---|---|---|
| CN | 1213438 A | 4/1999 | G03G 13/05 |
| GB | 1 445 053 | 8/1976 | G03G 15/08 |

(Continued)

OTHER PUBLICATIONS

Japanese Patent Office, communication in Japanese Patent Application No. 2009-511172 (dated Aug. 28, 2012).

*Primary Examiner* — Anh Do
(74) *Attorney, Agent, or Firm* — Fish & Richardson P.C.

(57) ABSTRACT

Monochromatic or multichromatic images may be created on surfaces. The surface is moved to first, second and third stations. The surface is electrically biased, and powder is transferred to the surface electrostatically at the first station. The powder is fused or sintered selectively on the surface at the second station. Unfused or unsintered portions of the powder are removed from the surface at the third station.

6 Claims, 5 Drawing Sheets

(56) References Cited

U.S. PATENT DOCUMENTS

| | | | | |
|---|---|---|---|---|
| 6,052,249 | A * | 4/2000 | Abraham et al. | 360/59 |
| 6,117,479 | A | 9/2000 | Hogan et al. | 427/2.14 |
| 6,406,738 | B1 | 6/2002 | Hogan et al. | 427/2.14 |
| 6,783,768 | B1 | 8/2004 | Brown et al. | 424/443 |
| 6,806,017 | B2 | 10/2004 | Reeves et al. | 430/102.2 |
| 6,850,725 | B2 | 2/2005 | Silence et al. | 399/297 |
| 7,481,884 | B2 | 1/2009 | Stelter et al. | 118/247 |
| 8,107,673 | B2 * | 1/2012 | Gutierrez M. et al. | 382/100 |
| 8,372,782 | B2 * | 2/2013 | Vetterling et al. | 503/204 |
| 2003/0113445 | A1 | 6/2003 | Martin | 427/2.14 |
| 2005/0158434 | A1 | 7/2005 | Reitnauer et al. | 106/31.29 |

FOREIGN PATENT DOCUMENTS

| | | | |
|---|---|---|---|
| JP | 57 078964 | 5/1982 | B05B 5/08 |
| JP | 61-283569 | 12/1986 | B41J 3/20 |
| JP | 07-257778 | 10/1995 | B65H 5/12 |
| JP | 10-260613 | 9/1998 | G03G 17/00 |
| SU | 336639 | 4/1972 | G03G 19/00 |
| WO | 92/09936 | 6/1992 | G03G 5/022 |
| WO | 92/14451 | 9/1992 | A61K 9/28 |
| WO | 96/35413 | 11/1996 | A61K 9/28 |
| WO | 96/35516 | 11/1996 | B05B 5/08 |
| WO | 97/33207 | 9/1997 | G03G 15/05 |
| WO | 01/43727 | 6/2001 | A61K 9/28 |

* cited by examiner

USE OF POWDERS FOR CREATING IMAGES ON OBJECTS, WEBS OR SHEETS

CROSS REFERENCE TO RELATED APPLICATIONS

This application is a divisional of U.S. application Ser. No. 12/300,232, which is a national phase filing under 35 U.S.C. §371 of International application number PCT/US2007/068676, filed on May 10, 2007, which claims priority from U.S. Provisional application No. 60/800,069, filed on May 12, 2006. The contents of the prior applications are incorporated herein by reference in their entirety.

FIELD OF THE DISCLOSURE

This disclosure relates to the use of powders to create images on food products, moving webs or sheets, and other objects.

BACKGROUND

It sometimes is desirable to mark an object, web or sheet with an image. Although packaging may include various information, marking directly on the product or object may provide additional product identification, ornamentation, advertising or marketing. For materials in web form that are often used for packaging or made into products where it is desirable to include various information, marking directly on the web material may provide additional product identification, ornamentation, advertising or marketing. Sheets of material are used to convey information, and it is desirable to mark directly on such sheets.

Several techniques are known for coating or marking various types of substrates. Electrostatic processes represent one group of such techniques. For example, in the reprographics industry, two primary powder-based processes and a liquid-based process are sometimes used for creating images. Such processes may use either monocomponent or dual component development systems. In the dry dual component system, for example, a carrier powder and an imaging powder, also known as a toner, are used. The carrier typically is reused in the system; whereas the imaging powder may be depleted depending on the quantity of material used to create the image and is replenished from a reservoir or other source.

A particular type of such processes includes laser printer techniques in which an image is transferred to a relatively flat surface. Current processes are complex, using up to seven process steps. Furthermore, these processes cannot be used to directly mark heat-sensitive substrates or nonplanar surfaces, and these processes are wasteful of the marking powder.

SUMMARY

In one aspect of the invention, a method of directly marking an object, web or sheet with a powder comprises moving the object, web or sheet to first, second and third stations. The method includes establishing an electric field between the object, web or sheet and the first station and transferring or applying electrostatically charged powder to a surface of the object, web or sheet at the first station by means of the electric field. The powder is imagewise fused or sintered on the surface of the object, web or sheet at the second station. Unfused or unsintered portions of the powder are removed from the surface of the object, web or sheet at the third station.

The techniques may be used for creating a monochromatic mark or a multichromatic mark on the surface of the object, web or sheet. In the event that a multichromatic mark is to be created, the object, web or sheet may be moved to multiple groups of stations, each of which includes a powder transfer station, an imaging station, and a powder removal station. Other stations may be present as well.

The position of the object, web or sheet with respect to the various stations is controlled by the provision of a holder or transport system that securely holds the object, web or sheet until imaging is completed. Various features may be present in some implementations. For example, in a particular implementation an object may be held by a holder using a mechanical fastener, tool or a vacuum as it is moved to each station. The holder may include a contact portion adapted to be in electrical contact with the object, and a conductive shield disposed about the object and electrically isolated from the object. The conductive shield is adapted to be biased with a voltage of a first polarity, the contact portion is adapted to bias the object with a voltage of an opposite polarity, and the powder transfer station is adapted to bias the powder with a voltage of the first polarity. The conductive shield may be disposed relative to the object and the bias voltage applied to the shield so as to limit areas of the object to which the powder is transferred at the powder transfer station. For example, the conductive shield may be disposed relative to the object and electrically biased so that the resulting electric field prevents the powder from being transferred to a back or sides of the object.

In another implementation where a mechanical holding system is not preferred, the contact portion of the holder may comprise, for example, a conductive elastomer bellows. The holder may include a tube to which a vacuum is applied to hold the object securely in place with respect to the conductive elastomer bellows.

In another implementation, a web or sheet of material is securely held and moved serially to the powder transfer station, the imaging station and the powder removal station. An electric field is set up between the web or sheet and the powder transfer station so that the web or sheet is coated with powder. The electric field may be created by arranging a biased roll or plate in close contact with the web or sheet and on the side opposite from the powder transfer station. Charged powder is transferred to the surface of the web or sheet at the powder transfer station. The imaging station is then used to fuse the image in this powder layer on the web or sheet, and finally, the powder removal station is used to remove the powder that has not been imaged, leaving a final image on the web or sheet.

In another implementation, the object, web or sheet is not sufficiently conductive or is too thick for an electrical bias to be used to create the electric field between the object, web or sheet and the powder transfer station. In this implementation, an electrostatic charge may be induced on the surface of the object, web or sheet using a corona or biased roll prior to moving to the powder transfer station.

The powder transfer station may include a means for continually bringing electrostatically charged powder into close proximity to the surface of the object, web or sheet so that the powder may be influenced by the electric field to move to the surface of the object, web or sheet. The electric field may be completed by electrically biasing all or part of the powder transfer station with respect to the object, web or sheet.

The station may also include a means for replenishing powder and for electrostatically charging replenished powder. Powder charging may be by means of, but not limited to, corona means, or triboelectric means such as surface area contact. The powder transfer station may bring the powder into proximity to the surface of the object, web or sheet by means of, but not limited to, mechanical, gravitational, fluid, magnetic, electrostatic, or air or gas pressure systems.

The imaging station may include a laser or diode to provide local fusing or sintering of the powder on the object, web or sheet and may be adapted to scan, modulate and focus a beam from the laser or diode across the surface of the object, web or sheet in an imagewise fashion. The object, web or sheet may be stationary or moving during the creation of the image. In an implementation where the object, web or sheet is moving during the creation of the image, a means for synchronizing the laser's or diode's action with the speed and/or position of the object, web or sheet is provided.

The powder removal station may use electrostatic, mechanical, fluid, positively pressurized gas, or vacuum or a combination of these means to remove the excess powder from the surface of the object, web or sheet after imaging has been completed.

In a particular implementation, the powder removal station has a pair of rolls adapted to rotate in opposite directions from one another. The rolls may comprise fur brushes so that surfaces of nonplanar objects can be physically contacted by the powder removal system. The brushes may include, for example, synthetic conductive fibers. The rolls may be biased with a voltage having a polarity opposite that of the object, web or sheet to remove unfused or unsintered portions of the powder from the surface of the object, web or sheet.

In an alternative implementation, the rolls may be biased and a powder on the rolls may be brought into contact with, or near, the surface of the object, web or sheet to remove unfused or unsintered portions of the powder from the surface of the object, web or sheet. In this implementation, the polarity of the powder on the rolls may be opposite to the polarity of the powder on the surface of the object, web, or sheet.

Unfused or unsintered portions of the powder from the powder removal station may be recirculated for reuse at the powder transfer station.

Various advantages may be present in some implementations. These advantages include, but are not limited to, the ability to create color and monochrome images on nonplanar surfaces and to control the location of such images, to create images on heat-sensitive surfaces that cannot otherwise accept powder-based melted images, and to create an imaging system that is very simple and uses a significantly reduced number of process steps to make a powder-based melted image, thereby lowering the cost and complexity of the imaging system and process. Other advantages include the ability to reuse powder that has first been applied to the surface of the object, web or sheet, thereby reducing the materials costs for a powder imaging system. Examples of applications may include, but are not limited to, creating an image with powder on the surface of confectionary items such as sugar-shelled candies, and upon toys such as miniature automobiles, and on plastic film such as disposable diaper coverings, and upon sheet metal such as control panels.

Other features and advantages may be readily apparent from the following description, the accompanying drawings and the claims.

DETAILED DESCRIPTION OF PREFERRED EMBODIMENTS

Figure 1:
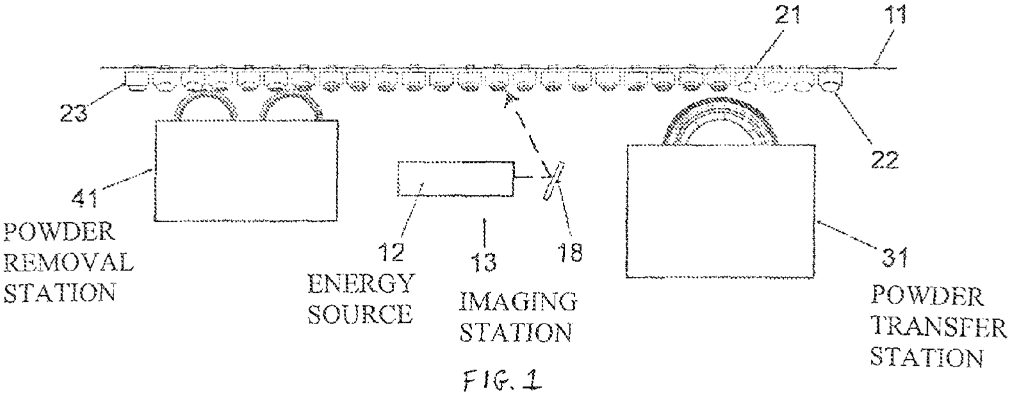
FIG. 1 illustrates an apparatus for electrostatically applying powder to an object and creating an image on the surface of the object.

FIG. 1 illustrates an apparatus for electrostatically applying a powder to an object and creating an image, for example, on the surface of the object. The apparatus can be used to form a coating or create an image on various three-dimensional objects, including objects having curved, stepped, angled or flat surfaces. Examples of such objects may include, but are not limited to, confectionary items intended for human consumption, food objects such as dog bone treats intended for animal consumption, or non-food objects such as miniature toy automobiles and process objects such as disposable diaper coverings.

As shown in FIG. 1, the apparatus may include a holder 21 to securely hold an object 22 to be marked with the powder, a powder transfer station 31 adapted to transfer the powder to a surface of the object electrostatically, an imaging station 13 including a source of energy 12 adapted to selectively fuse the powder on the surface of the object, a powder removal station 41 to remove unfused or unsintered portions of the powder from the surface of the object, and a conveyor 11 to transport the object 22 serially to the powder transfer station, the imaging station and the powder removal station while the object is held by the holder. In some applications, it may be desirable to configure the apparatus so that multiple objects can be moved serially to the stations at a high rate, with the powder being used to coat or create an image on each object as it is moved sequentially to the stations 31, 13, and 41.

At the first station 31, powder is transferred electrostatically to the surface of the candy or other object 22 as it is securely held by the holder 21. The object 22 preferably is held such that an electric field is established between the object surface to be coated and the source of powder at the first station. This can be achieved, for example, by biasing the powder transfer station with a voltage of a first polarity, and biasing the object with a voltage of an opposite polarity. The outer shell 23, e.g., conductive shield, of the holder 21 for the object should be isolated electrically from the object and electrically biased with respect to the object so that it does not become coated with powder.

Figure 1A:
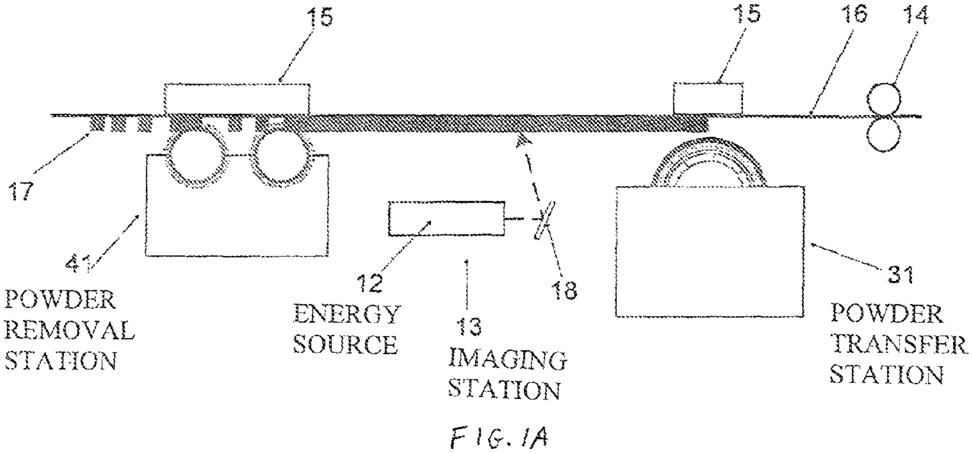
FIG. 1A illustrates an apparatus for electrostatically applying powder to a continuous web or sheet and creating images on the surface of the web or sheet.

FIG. 1A illustrates an apparatus for electrostatically applying a powder to the flat surface of a web or sheet 16. The apparatus can be used to create images on various web or sheet materials including, but not limited to, metal, wood, paper and plastic. As shown in FIG. 1A, the apparatus includes a powder transfer station 31 adapted to transfer the powder to a surface of the web or sheet electrostatically, an imaging station 13 including a source of energy 12 adapted to selectively fuse the powder on the surface of the web or sheet, a powder removal station 41 to remove unfused or unsintered portions of the powder from the surface of the web or sheet, and a transport 14 to securely hold and move the web or sheet serially to the powder transfer station, the imaging station and the powder removal station. As shown, the web or sheet 16 is moved from right to left through the apparatus by means of transport rolls 14. Other transport means such as vacuum feeders, belts, chains or sprockets may also be used to move the web or sheet. A bias voltage is applied to the web or sheet so that there is an electric field set up between the web or sheet and the powder transfer station 31. For web or sheet materials that are not electrically conductive, a bias may be applied to a conductive member 15 that is in contact with the far side of the web or sheet opposite the powder transfer station 31. The conductive member 15 may be, for example, a plate, roll or shoe. The powder coating is selectively fused at the imaging station 13 and the excess powder is removed from the web or sheet at the powder removal station 41, leaving final image 17 on the web or sheet.

Figure 2:
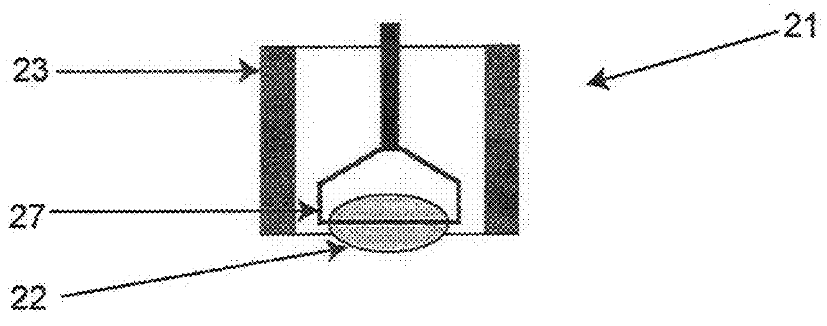
FIG. 2 illustrates an example of a holder using a mechanical tool to securely hold an object as it is moved to various stations during the imaging process.

FIG. 2 illustrates an example of a holder 21 used to hold an object 22 securely as it is moved to the stations, 31, 13, and 41 during the imaging process. The holder 21 has a contact portion 27 adapted to be in contact with the object. The contact portion may be a mechanical conductive fastener such as a bolt or gripping tool so that a bias can be applied while ensuring good contact with the object. A conductive shield 23 is disposed about the object 22 and is electrically isolated from the object 22. The conductive shield 23 may be disposed relative to the object 22 to limit areas of the object 22 to which the powder is to be transferred. For example, the conductive shield may be positioned to prevent the powder from being transferred to a back or sides of the object. To control the coated area and to prevent the shield 23 from becoming coated with the powder, the shield is biased with a voltage of a first polarity, and the object 22 is biased with a voltage of the opposite polarity.

Figure 2A:
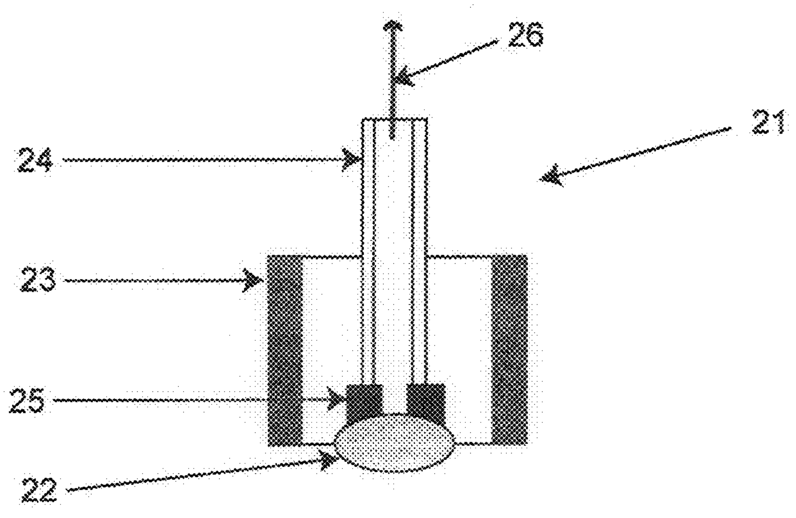
FIG. 2A illustrates a holder using a vacuum to securely hold an object as it is moved to various stations during the imaging process.

FIG. 2A illustrates an example of a holder 21 using a vacuum to securely hold an object 22 as it is moved to the stations, 31, 13, and 41 during the imaging process. The holder 21 has a contact portion 25 adapted to be in contact with the object. The contact portion may comprise a soft conductive elastomer so that an electric field can be applied while ensuring good contact with the object. A tube 24 to which a vacuum 26 is applied may hold the object in place with respect to the contact portion 25 in order to prevent the object from moving with respect to the holder.

A conductive shield 23 is disposed about the object 22 and is electrically isolated from the object 22. The conductive shield 23 may be disposed relative to the object 22 to limit areas of the object 22 to which the powder is to be transferred. For example, the conductive shield may be positioned to prevent the powder from being transferred to a back or sides of the object. To control the coated area and to prevent the shield 23 from becoming coated with the powder, the shield is biased with a voltage of a first polarity, and the object 22 is biased with a voltage of the opposite polarity.

Imaging powders may include a thermoplastic or thermosetting polymer and may also include a functional agent. Functional agents may be a colorant, flavorant, bioactive, metal, ceramic, photo-responsive, or otherwise active material. The polymer may provide a medium for containment of the functional agent, for developing a triboelectric charge, or for melting the toner on the surface of an object. Polymers with low glass transition temperatures may be desirable for use when imaging on foods to avoid melting the food product during the fusing process. In an implementation with some high temperature functional materials, the powders may not melt but may be sintered together and to the substrate surface in order to form the image.

In addition to the polymer and functional agent, the powder optionally may include one or more of a charge control additive, a wax additive, a plasticizer, a filler or diluent, or a surface additive.

A charge control additive may enhance the magnitude and rate of triboelectric charging and can help ensure stable electrostatic charging over an extended time. A wax additive may help improve the fusing or melt flow behavior of the powder and dispersion characteristics of components in the toner. A plasticizer may significantly lower the glass transition temperature (Tg) of the thermoplastic polymer, making it more pliable and easier to work with. Adding a filler or diluent to the composition of the powder can enable reduction of the overall cost and may enhance capacity. It also can be used as a deglossing agent or to influence powder flow properties.

Imaging powders in the mean particle size range from a few microns to about one hundred microns may be used in this process. In a preferred embodiment, powders having a mean particle size in the range of five microns to forty microns may be used.

Imaging powders of any color may be used in this process. For many applications, a $CO_2$ laser can be used in the imaging station to fuse any color powder. For some applications, it may be desirable to use a laser diode or fiber laser, particularly where cost, size and speed are an issue. Some color powders such as clear, yellow, magenta, some cyans, blue and red will not absorb the wavelength of the light from laser diodes or fiber lasers. In that instance it may be desirable to incorporate infrared absorbing materials in the powder.

An example of an imaging powder using functional agents for a specific purpose is provided for imaging on food products. For food products, it is desirable for the powder to consist essentially of food-grade components. The powder may include, for example, a thermoplastic polymer and colorant, as well as one or more of a charge control additive, a wax additive, a plasticizer, a filler or diluent, or a surface additive. Particular examples of food-grade powders are described in a PCT Patent Application Ser. No. PCT/US07/68674 filed on May 10, 2007 and entitled "FOOD-GRADE TONER". The disclosure of that application is incorporated herein by reference.

The imaging powder may be combined mechanically with a magnetically active powder (i.e., a carrier) to form a developer mix. In this process, the carrier serves to charge the imaging powder triboelectrically, and the smaller imaging powder particles adhere to the larger carrier particles. This then enables the carrier to be used to transport the imaging powder to the surface of the object, web or sheet by electrostatic and magnetic forces. The imaging powder and carrier should be blended so as to optimize the electrostatic and other properties for the particular imaging powder application and imaging system.

Figure 3:
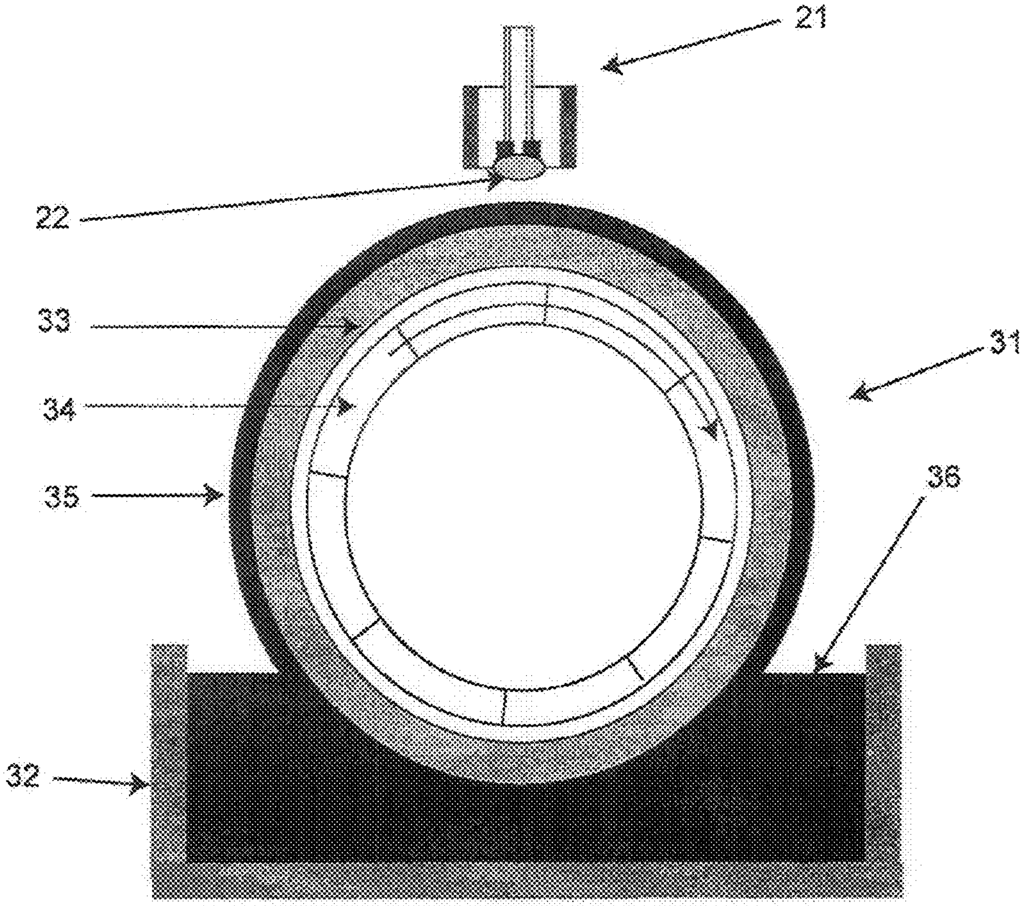
FIG. 3 illustrates details of a powder transfer station according to a particular implementation.

FIG. 3 illustrates further details of a powder transfer station 31 according to a particular implementation that includes a roll 33 having a metal shell around a magnetic core 34. In this implementation, the magnetic core is rotatable and the outer shell is stationary. The lower part of the roll 33 is immersed in a developer mix 36 contained in a reservoir 32. As the magnetic core rotates, the magnetic field penetrating the shell causes some of the developer mix 36 to be picked up and transported as a layer 35 around the surface of the shell.

In the illustrated implementation, an object 22 held securely by the holder 21 is positioned or moved past at a fixed distance from the roll 33 and may or may not contact the developer mix on the surface of the roll. As the transported developer mix comes opposite the object 22, it begins to react to the electric field between the shell and the object. The electric field is set to be stronger than the remaining electrostatic forces holding the imaging powder particles to the surface of the carrier particles. This results in some of the imaging powder being transferred to the surface of the object 22 where it is held electrostatically. Alternatively, the electric field may be an alternating field with a constant bias, the result of which is to provide forces that separate the imaging powder from the carrier and also cause a net attraction of the imaging powder to the object 22 where it is held electrostatically.

In this implementation, the amount of powder coating on the object may be controlled by the magnitude of the electric field between the object and the outer shell of the magnetic roll 33, the relative speed of the object and the shell or the time during which they are in opposition, the duration of the applied field, and the triboelectric charge on the powder. In this process, the imaging powder is held electrostatically on the surface of the object, web or sheet and will not fall off provided that the imaging powder is electrostatically insulative. The object, web or sheet can be processed without any additional requirement to tack or secure the powder on the surface.

Alternative powder transfer stations using technology and designs used in the reprographic industry also can be used to coat the object, web or sheet. Alternative powder transfer stations may include other roll developer systems such as magnetic brush developers of different configuration, fur brush developers, and single component roll developers using contact triboelectric charging means to charge the powder. Developers that do not employ a roll as the primary powder transport can also be used. These developers may include cascade developers, other gravity fed developers, fluidized bed developers and powder cloud developers. In each implementation, it is required that charged powder be brought into close proximity to the object, web or sheet to be coated and that an electric field be established so that the powder is induced to move to the surface of the object.

In some cases, parts of the surface of the object, web or sheet may be coated selectively with the powder. For example, it may be preferable to coat only one side of the object. In some cases, a screen with one or more openings may be placed near the object, web or sheet so that the screen selectively blocks the powder from being applied to portions of the object, web or sheet. In other cases, the shield or screen may be segmented and each segment biased differently to cause the desired effect.

After the powder is applied to the object 22, the object is moved, while still securely held by the holder 21, to the imaging station 13, where the object is subjected to a source of energy to obtain localized fusing or sintering of the powder on the object surface according to a predetermined pattern or image. This may be accomplished, for example, by laser imaging in which light emitted from a laser melts or sinters the powder so that the powder particles fuse or sinter together and adhere to particular areas on the surface of the object. Thus, the laser power density should be sufficient to melt the powder or raise its temperature so that the particles fuse or sinter together and adhere to the surface of the object. The desired image pattern may be supplied to the laser writing head in a bitmap form using, for example, software executed by a standard personal computer or other industrial controller. The image pattern may be produced by applying modulation and deflection to the laser beam, and by focusing the laser beam into a small spot on the surface of the object, web or sheet where the powder is located.

Various imaging systems may be used. In one implementation, a relatively low power laser diode or diode array can be used. In another implementation, a fiber laser can be used. As shown in FIGS. 1 and 1A, a pair of external galvanometers 18 may be used to create XY deflections, and the diode or diode array can be modulated directly. Alternatively, a rotating polygon mirror driven by a motor may be used to deflect the beam in the X direction while the transport provides the Y deflection. A lens may provide focus and curvature correction so that the image plane approximately matches a nonplanar surface of the object, if required.

Laser diodes and fiber lasers having the desired power levels may be limited to particular wavelengths (e.g., red or infrared) which makes them suitable for use with black or some cyan powders, but not with certain other colors. Alternatively, uncolored materials that are sensitive to these wavelengths may be incorporated in the powders so that the energy is readily absorbed and fusing or sintering can take place. In these instances, the visible color of the powder may be one that does not absorb the wavelength of the laser.

In another implementation, the imaging station 13 may include a $CO_2$ gas laser package 12. The gas laser package may include a gas laser, power supplies, modulator, focusing optics and galvanometer deflection system in a single casing. The advantage of such a package is that it produces light at a wavelength that can be absorbed by a wide range of clear or color powders, and it has a higher power (e.g., 30 Watts) to enable higher speeds to be met. Even higher speeds may be obtained using a deflection system that makes uses of a reflective polygon driven by a high speed motor. In this case, an external beam modulator may be employed with the $CO_2$ laser. Other laser imaging systems may be used.

In some applications, the object, web or sheet may be securely held and continuously transported past the imaging station during the imaging process. In these applications, the speed and/or position of the object, web or sheet may be sensed and provided to the laser control system to synchronize the laser's action and correctly form the image.

The unfused or unsintered powder remaining on the surface of the object 22 is undisturbed. In some cases, after the imaging has been completed, there may be no easily visible appearance change in the powder on the surface of the object.

After the imaging has been completed, the object 22 is moved, while still securely held by the holder 21, to the powder removal station 41 where the unfused or unsintered powder (if any) is removed from the surface of the object, thus leaving the fused or sintered image on the surface.

Figure 4:
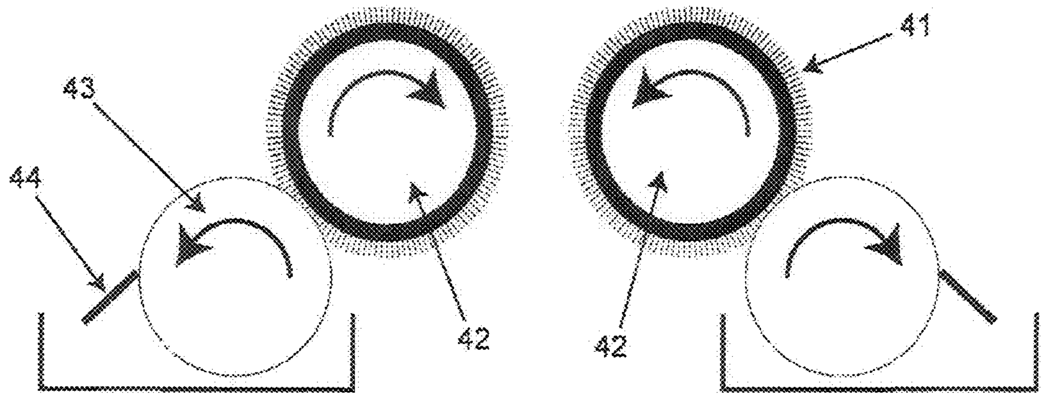
FIG. 4 illustrates an example of a powder removal station to remove unfused or unsintered powder from the surface of an object.

The unfused or unsintered portions of the powder may be removed from the object using electrostatic forces. For example, according to a particular implementation, the powder removal station 41 has a pair of rolls 42 adapted to rotate in opposite directions from one another (see FIG. 4). The object held by the holder is brought into close proximity to each of the rolls in succession. The rolls are biased with a voltage having a polarity opposite that of the object, web or sheet so as to set up an electric field between the object and the rolls. This will move unfused or unsintered portions of the powder from the surface of the object, web or sheet to the roll or rolls. The rolls may comprise, for example, fur brushes with synthetic conductive fibers. In this case, the fibers should have a depth that allows them to easily reach the full coated depth of the object to remove any unfused or unsintered powder.

The unfused or unsintered powder that is removed at the powder removal station 41 may be recycled for subsequent use. The powder may be removed from the oppositely rotating rolls by bringing each of the brushes into contact with a metal roll 43 that is oppositely biased to the bias on the brush. Once the powder is transferred to the metal roll, it can be removed, for example, by means of a simple elastomeric scraper or metal blade 44. The powder then can be reused at the powder transfer station 31.

In an alternative implementation, the powder removal station 41 includes one or a pair of magnetic rolls adapted to rotate in opposite directions from one another. In this system, materials similar to those used in the powder transfer process are used to remove excess powder. A magnetically active powder (i.e., a carrier) on the roll or rolls is brought into contact with, or near, the surface of the object 22. The electric field is reversed so that unfused or unsintered powder on the surface of the object is attracted to the magnetic roll and is picked up by the carrier powder and carried away from the object surface as the magnetic rolls rotate. The powder then may be separated from the powder-carrier mixture on the magnetic rolls by providing another electric field to transfer the powder to another set of rolls. As noted above, the powder then can be recirculated for use at the powder transfer station 41.

In another implementation, the unfused or unsintered powder may be removed by the application of pressurized air or another gas.

In another implementation, the unfused or unsintered powder may be removed by the application of vacuum or suction.

In many applications, the powder will be sufficiently fused or sintered on the surface of the object 22, web or sheet at the imaging station 13 such that there will be little likelihood of the fused or sintered powder not adhering well to the surface. Nevertheless, in some applications, it may be desirable to move the object, web or sheet to a fourth station to provide post-imaging flash or radiant fusing of the powder on the surface of the object, web or sheet. Such flash or radiant fusing stations are well known and have been used in the reprographics industry.

In the implementation described above, the object 22 is biased electrically so that the powder can be transferred to the object electrostatically. The holder 21 provides the bias through the conductive contact portion 25. Such techniques may be used for electrostatically conductive objects. For electrostatically nonconductive objects, webs or sheets, a charging station may be provided to induce a charge on the surface of the object, web or sheet. In that case, a ground plane should be placed behind the object, web or sheet. For objects, the contact portion 25 or 27 of the holder 21 can serve that purpose. For webs and sheets, a conductive member 15, for example, a roll, plate or shoe, in contact with the far side of the web or sheet opposite the powder transfer station 31 can serve that purpose. The charging station may be implemented, for example, by a biased roll in contact with the object, web or sheet, or a corona device spaced at a distance from the object, web or sheet.

The images formed on the surface of objects, webs or sheets may include one or more alphanumeric symbols, graphic symbols, or other types of images. The image created by the powder may be monochromatic or multichromatic. In the case of a multichromatic image, the process for applying and fusing the powder on the object, as well as removing unfused or unsintered powder from the object, may be repeated using two or more powders having different colors. In some cases, a first powder may be applied and fused over part or all of the surface of the object, web or sheet and can serve as a coating. A second powder having a different color then may be applied and fused on the surface of the object, web or sheet to form the image.

Figure 5:
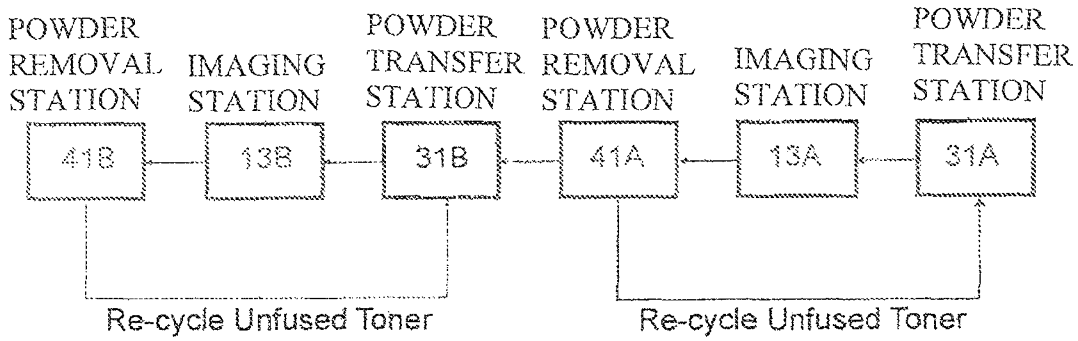
FIG. 5 is a block diagram of an apparatus for using powders to create a multichromatic image on the surface of an object.

To facilitate the creation of a multichromatic image on the surface of the object, web or sheet, the apparatus may include two or more sets of the stations 31, 13, and 41 arranged serially (see FIG. 5). Thus, for example, a powder of a first color may be applied and fused or sintered on the surface of the object, web or sheet at stations 31A and 13A, respectively. The unfused or unsintered powder of the first color may be removed at a powder removal station 41A. Then, a powder of a second color may be applied and fused or sintered on the surface of the object at stations 31B and 13B, respectively. The unfused or unsintered powder of the second color may be removed at a second powder removal station 41B.

The apparatus described above may be used to create images on objects having nonplanar or irregular as well as planar surfaces.

Other implementations are within the scope of the claims.

What is claimed is:

1. An apparatus to hold an object securely during a thermal imaging process, the apparatus comprising:

a conductive contact portion adapted to be in contact with the object; and a conductive shield disposed about the contact portion and electrically isolated from the contact portion and from the object, wherein the conductive shield is biased with a voltage of a first polarity, and the object is biased with a voltage of an opposite polarity.

2. The apparatus of claim 1 wherein the contact portion comprises a mechanical conductive fastener.

3. The apparatus of claim 2 wherein the mechanical conductive fastener comprises a bolt.

4. The apparatus of claim 2 wherein the mechanical conductive fastener comprises a gripping tool.

5. The apparatus of claim 1 wherein the contact portion comprises a conductive elastomer.

6. The apparatus of claim 1 further comprising a tube to which a vacuum is applied to hold the object in place with respect to the contact portion.

* * * * *